United States Patent
Stone et al.

(10) Patent No.: US 7,861,456 B2
(45) Date of Patent: Jan. 4, 2011

(54) FISHING RIG

(76) Inventors: Gary D. Stone, P.O. Box 3796, Abilene, TX (US) 79604; Tom D. Horner, P.O. Box 997, Mineral Wells, TX (US) 76067

( * ) Notice: Subject to any disclaimer, the term of this patent is extended or adjusted under 35 U.S.C. 154(b) by 295 days.

(21) Appl. No.: 12/219,242

(22) Filed: Jul. 18, 2008

(65) Prior Publication Data
US 2009/0077860 A1    Mar. 26, 2009

Related U.S. Application Data

(63) Continuation of application No. 11/505,383, filed on Aug. 17, 2006, now abandoned.

(51) Int. Cl.
*A01K 91/053*    (2006.01)
(52) U.S. Cl. ............ 43/42.74; 43/44.84; 43/43.15
(58) Field of Classification Search .......... 43/42.74, 43/27.4, 44.84, 43.15, 43.1, 44.83
See application file for complete search history.

(56) References Cited

U.S. PATENT DOCUMENTS

| | | | |
|---|---|---|---|
| 2,157,003 A | 5/1939 | Mussina | |
| 2,589,715 A | 3/1952 | Lysikowski | |
| 2,791,060 A | 5/1957 | Kender | |
| 2,907,133 A | 10/1959 | Myers | |
| 3,137,962 A | 6/1964 | Linley, Sr. | |
| 3,703,047 A | 11/1972 | Schenavar et al. | |
| 4,538,374 A | 9/1985 | Louthan | |
| 5,404,668 A | 4/1995 | Christensen | |
| 6,618,980 B1 | 9/2003 | De Boer, Jr. | |
| 2003/0233783 A1 | 12/2003 | Storelli | |

FOREIGN PATENT DOCUMENTS

JP    2005058047 A  *  3/2005

* cited by examiner

*Primary Examiner*—Joshua J Michener
(74) *Attorney, Agent, or Firm*—Stephen R. Greiner

(57) ABSTRACT

A fishing rig that reduces the likelihood of snags on submerged objects. The fishing rig includes a flexible rod and a retainer secured to the top of the rod. The retainer has a ring for fastening a fishing line to the rig. A float is secured to the rod adjacent the retainer. A sinker is secured to the bottom of the rod. A spreader is secured to the rod between the retainer and the float. The spreader has a pair of outstretched arms, each of which has an outer end with an aperture therein. Two flexible leaders have inside ends that are connected to the ring and have outside ends extending respectively through the apertures. A fishhook is fastened to the outside end of each one of the flexible leaders.

1 Claim, 1 Drawing Sheet

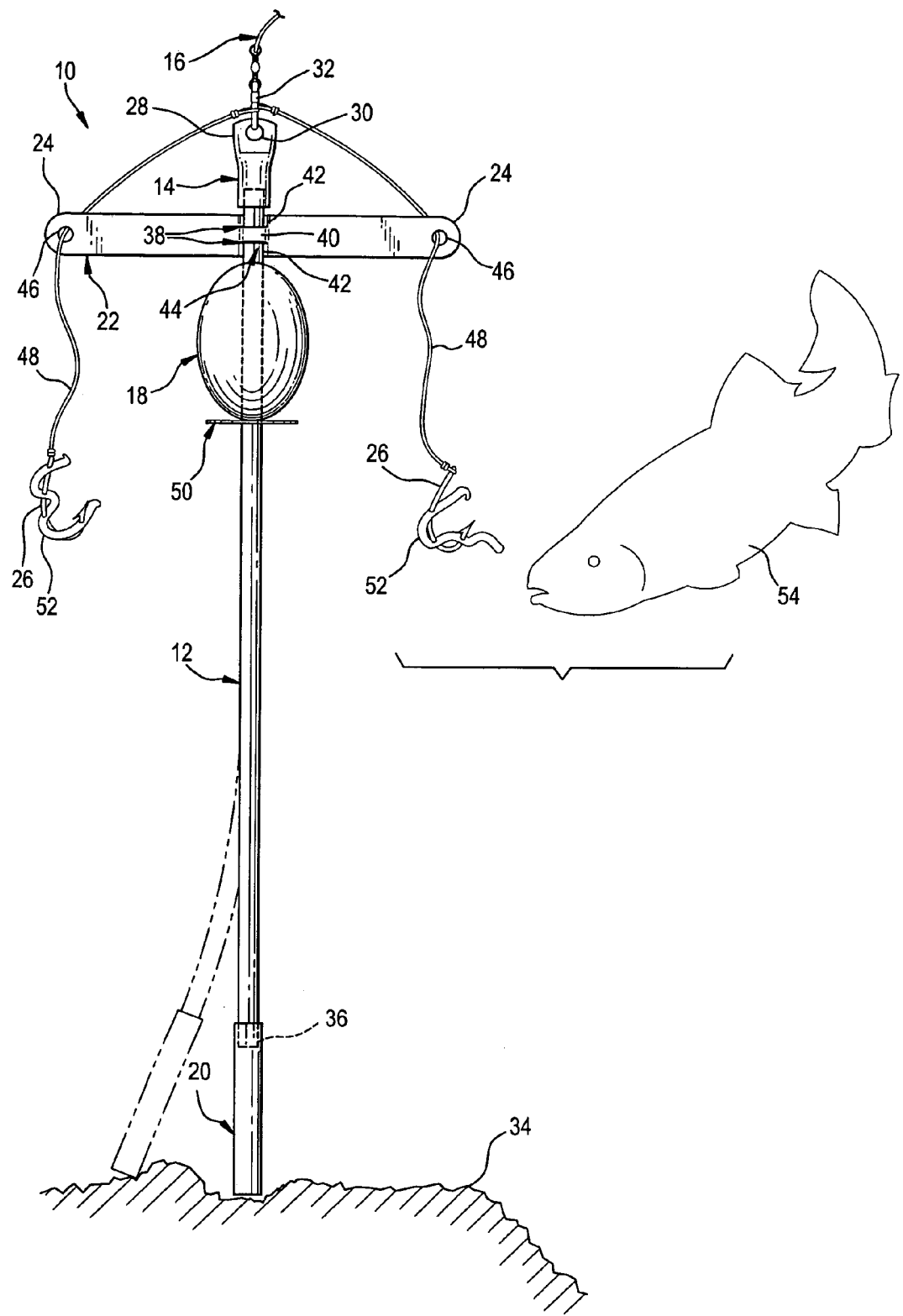

FISHING RIG

CONTINUING APPLICATION DATA

This application is a continuation of U.S. patent application Ser. No. 11/505,383, filed on Aug. 17, 2006, now abandoned.

FIELD OF THE INVENTION

The present invention relates generally to fishing and, more particularly, to line-attached bodies, hooks, and rigs.

BACKGROUND OF THE INVENTION

Most game fish spend a significant portion of their lives feeding near the bottom of a body of water that serves as their home. Successful fisherman put their bait near the bottom since the likelihood of catching fish is greatly increased. Unfortunately, most game fish shy away from open, sandy bottoms that are easily fished by man and other predators. Game fish rather feed in rocky or obstructed areas that afford numerous hiding places from which to spring upon prey. Thus, catching large numbers of fish without losing too much tackle on submerged snags requires a great deal of skill.

In addition to losing tackle, fishermen loose time dealing with snags. Most will try to free their lures without breaking their fishing line. The effort made is usually proportional to the value of the lure at risk of loss, with expensive lures meriting considerable expenditures of time and manpower. Many altogether dry fishermen will enter the water to retrieve a snagged lure. Of course, losing a lure means that a fisherman must dig into his tackle box and make a time-consuming replacement.

Since time wasted on retrieving snagged lures is time that is diverted from fishing, some fishermen have proposed "snag-free" rigs for suspending lures at a fixed distance above the bottom of a body of water serving as game fish habitat. These rigs have included complex arrangements of fishhooks, floats, and sinkers, some of which are detachable when placed under great strain as when snagged. Because of their cumbersome nature and cost, these rigs have not seen widespread acceptance by fishermen.

SUMMARY OF THE INVENTION

In light of the problems associated with the known devices for suspending fish bait near the rocky and obstructed bottoms of some water bodies, it is a principal object of the invention to provide a fishing rig of uncomplicated construction and reasonable cost that will suspend a pair of baited fishhooks above a rocky water bottom thereby effectively preventing snags.

It is another object of the invention to provide a fishing rig of the type described that features a fin-like spreader at its top from each of the opposite ends of which a fishhook is suspended. The spreader is symmetrical so that, when the fishing rig is deployed in a body of water wherein a current flows, the fin will automatically turn to face the current thereby maintaining the maximum distance between the fishhooks for the greatest exposure to game fish that tend to feed while headed upstream.

It is a further object of the invention to provide a fishing rig of the type described that can be deployed by a fisherman at the end of a fishing line with minimal instruction and with no tools whatsoever.

It is an object of the invention to provide improved features and arrangements thereof in a fishing rig for the purposes described that is lightweight in construction, inexpensive to manufacture, and dependable in use.

Briefly, the fishing rig in accordance with this invention achieves the intended objects by featuring a flexible rod and a retainer secured to the top of the rod. The retainer has a ring for fastening a fishing line to the rig. A float is secured to the rod adjacent the retainer. A sinker is secured to the bottom of the rod. A spreader is secured at its midpoint to the rod between the retainer and the float. The spreader has a pair of outstretched arms, each of which is a flat plate having an outer end with an aperture therein. Two flexible leaders have inside ends that are connected to the ring and have outside ends extending respectively through the apertures. A fishhook is fastened to the outside end of each one of the flexible leaders.

The foregoing and other objects, features, and advantages of the present invention will become readily apparent upon further review of the following detailed description of the preferred embodiment as illustrated in the accompanying drawing.

BRIEF DESCRIPTION OF THE DRAWING

The present invention may be more readily described with reference to the accompanying drawing that is a side elevational view of a fishing rig in accordance with the present invention deployed in a body of water.

DETAILED DESCRIPTION OF THE PREFERRED EMBODIMENT

Referring now to the FIGURE, a fishing rig in accordance with the present invention is shown at 10. Fishing rig 10 includes a flexible rod 12 having a retainer 14 affixed to its top for attachment to a fishing line 16. A float 18 is attached to rod 12 adjacent retainer 14 and a sinker 20 is affixed to the bottom of rod 12. Between retainer 14 and float 18, a spreader 22, having a pair of outstretched arms 24, is attached to rod 12. One of a pair of fishhooks 26 is suspended from each of arms 24.

Flexible rod 12 is a nylon filament having a length of about 17 inches (43 cm) and a diameter of about 0.155 inches (0.39 cm). Nylon is not buoyant in water. Nylon, however, is durable and is flexible enough to permit rod 12 to bend somewhat when brought into contact with an underwater obstacle and permit rod 12 to be coiled for the compact storage of rig 10 in a tackle box.

Retainer 14 is a brass tube having an outer diameter of about 0.25 inches (0.64 cm) and an internal diameter sufficient to snugly receive the top of rod 12 that is affixed by a suitable adhesive within the bottom of retainer 14. Retainer 14 is flattened at its top and perforated with a hole 30 to provide an upwardly extending ring 28. By means of a combination snap link and swivel 32 clipped to ring 28, fishing line 16 is releasably connected to rig 10.

Float 18 is formed of Styrofoam and has a buoyancy sufficient to retain rod 12 in a substantially vertical orientation when engaged with the rocky bottom 34 of a water body. It is not preferred that float 18 have a buoyancy sufficient to cause rig 10 to float upon the surface of a body of water or drift in a neutral manner beneath the surface, though the provision of a float 18 with these characteristics is largely a matter of design choice since it is believed that rig 18 would catch fish if it was positively or neutrally buoyant.

Float 18 has an oval silhouette when viewed from the side. As is well known, an oval-shaped float does not discourage the feeding of game fish. Furthermore, oval-shaped float 18 is easy to retrieve, having a maximum diameter of 1.1 inches (2.8 cm) and a length of 2 inches (5 cm), minimizing drag in the water, and is unlikely to catch submerged grasses or debris.

Sinker 20 is a brass dowel having an outer diameter of about 0.25 inches (0.64 cm) that bounces and slides easily over rocks and other submerged obstructions. The top of sinker 20 is provided with a longitudinal bore 36 that is sized to snugly receive the bottom of rod 12 therein. The bottom of rod 12 is affixed within bore 36 by means of a suitable adhesive. Providing sinker 20 with a weight of about 36 grams affords rig 10 with the ability to sink quickly to the bottom of a body of water yet be retrieved with minimal difficulty.

Spreader 22 is formed from an elongated strip of high-density polyethylene that measures about: 5.75 inches (14.6 cm) in length, 0.75 inches (1.9 cm) in height, and 0.03 inches (0.08 cm) in thickness. As shown, a pair of longitudinal slots 38 are provided at the middle of spreader 22 that define a retaining tab 40 therebetween and further define a pair of retaining strips 42 between slots 38 and the top and bottom of spreader 22. By deforming tab 40 forwardly and by deforming strips 42 rearwardly, as shown in the drawing, a vertical passageway 44 is formed in spreader 22 through which rod 12 is extended. Passageway 44, having a smaller diameter than retainer 14, prevents spreader 22 from becoming detached from rod 12.

Retaining tab 40 and retaining strips 42 connect arms 24 together. An aperture 46 is provided in the free end of each of arms 24 that are essentially flat plates oriented in the same plane. A pair of flexible leaders 48 extends from the eyes of fishhooks 26 through apertures 46 and terminates at snap link 32 to which such are fastened. If desired, leaders 48 can be extended through hole 30 and tied directly to retainer 14. Leaders 48 have a length that is about one-third that of rod 12 to ensure that fishhooks 26 do not engage bottom 34.

A washer or collar 50 is snugly, yet slidably, positioned upon rod 12 between sinker 20 and float 18. Collar 50 retains float 18 near the top of rod 12 so that rig 10 always remains upright during use. Nonetheless, collar 50 permits float 18 and spreader 22 to slide down rod 12 in the unlikely event that rig 10 snag upon an underwater obstruction upon retrieval so as to offer means to wiggle free of the obstruction. Collar 50 is formed of the same material as spreader, namely high-density polyethylene.

The use of fishing rig 10 is straightforward. First, rig 10 is connected to a fishing rod (not shown) by clipping fishing line 16 to retainer 14 by means of snap link 32. Next, bait 52, such as live worms, is placed on fishhooks 26. Then, rig 10 is cast into a body of water in the usual manner and is permitted to settle to the rocky or obstructed bottom 34 thereof. With no retrieval of rig 10 being necessary to catch a game fish 54, a fisherman now waits for the strike of game fish 54.

A slight subsurface current will automatically orient spreader 22 at right angles to the current. Such an orientation maximizes the chances of a fish strike by distancing baited fishhooks 26 from one another to the maximum possible degree and presents the baited fishhooks 26 cleanly to game fish 54 looking for a meal to drift downstream. Rig 10 always maintains fishhooks 26 at a distance from bottom 34 thereby preventing troublesome snags.

During retrieval to check bait 52, fishing rig 10 can be given a wiggling action by manipulating the rod and reel so that the baited fishhooks 26 simulate the erratic motions of wounded animals that game fish 54 finds attractive. Furthermore, the flexing and bounding of rod 12 over rocky bottom 34 tends to produce further erratic motions in fishhooks 26. A colorful paint applied to float 18 can enhance the tendency of game fish 54 to strike at fishhooks 26. If game fish 54 does not bite, replacing bait 52 with a different type of bait, say minnows, can enhance opportunities for a strike.

When reeled in slowly, fishing rig 10 remains in a near-vertical position. When reeled in quickly, spreader 22 lifts rig 10 to the surface in the manner of a hydrofoil wing and rig 10 skims across the water surface. The lift generated by spreader 22 reduces likelihood of snags that occur with other fishing devices that have weights and hooks dragging on the bottom.

When fish 54 strikes rig 10, a tug is felt on line 16 and fishhook 26 is set in the mouth of the fish 54 by pulling sharply on line 16. After line 16 is reeled in, the just-caught fish 54 can be released from fishhook 26 and either set free or can be harvested. Use of fishing rig 10, will provide a fisherman with more opportunities to make such a choice than has been possible heretofore.

When a fisherman has caught his limit or has otherwise decided to terminate his fishing efforts, fishing rig 10 is detached from line 16 and is coiled and placed in a tackle box for reuse at another time. No further disassembly of fishing rig 10 is required as its compact size lends itself easy storage in a tackle box. The process of setting up fishing rig 10 for use or stowing rig 10 after use requires just a few minutes to complete.

From the foregoing, it should be appreciated that fishing rig 10 offers benefits to those fishing from a shoreline, pier, bridge or boat. The vertical position of rod 12 maintained by float 18 provides protection against snags in all settings. This is especially important when fishing from a drifting boat in areas where the configuration of the bottom is unknown. With the protection against snags afforded by rig 10, the loss of tackle and time is minimized and the opportunities to catch fish are maximized.

While fishing rig 10 has been described with a high degree of particularity, it will be appreciated by those skilled in the art that modifications can be made to it. For example, float 18 can be adhesively fastened to rod 12 thereby obviating the need for collar 50. Therefore, it is to be understood that the present invention is not limited to the sole fishing rig embodiment described above, but encompasses any and all embodiments within the scope of the following claims.

We claim:

1. A fishing rig, comprising:
   a flexible rod;
   a retainer being secured to the top of said flexible rod, said retainer having a ring for fastening a fishing line to the fishing rig;
   a float being secured to said flexible rod adjacent said retainer;
   a sinker being secured to the bottom of said flexible rod, said sinker being a metallic dowel having an outer diameter that is substantially equal to that of said flexible rod and, also, having a longitudinal bore in the top thereof for receiving the bottom of said flexible rod therein;
   a spreader being secured at its midpoint to said flexible rod between said retainer and said float, said spreader having a pair of outstretched arms, each of said arms being a flat plate and having an outer end remote from said flexible rod, each said outer end having an aperture therein, said spreader being formed from an elongated strip of plastic, said plastic strip being provided with a pair of vertically spaced slots proximate the midpoint thereof, said slots defining a retaining tab therebetween and a pair of retaining strips with one of said strips being positioned above said slots and the other of said strips being positioned below said slots, said tab being deformed forwardly and said retaining strips being deformed rearwardly so as to define a vertical passageway for receiving said flexible rod;

a retaining collar being secured to said flexible rod between said sinker and said float for holding said float against said spreader;

a pair of flexible leaders having inside ends being connected to said ring and having outside ends extending respectively through said apertures; and, a pair of fishhooks, each of said fishhooks being fastened to a respective one of said outside ends of said flexible leaders.

* * * * *